(12) United States Patent
Ikeda et al.

(10) Patent No.: US 6,344,516 B1
(45) Date of Patent: Feb. 5, 2002

(54) RESIN COMPOSITION AND PROCESS FOR PRODUCING THE SAME

(75) Inventors: Ryohei Ikeda, Yokohama; Shiro Kobayashi, Tsukuba; Hiroshi Uyama, Kyoto, all of (JP)

(73) Assignees: National Institute of Advanced Industrial Science and Technology; Japan Chemical Innovation Institute, both of Tokyo (JP)

(*) Notice: Subject to any disclaimer, the term of this patent is extended or adjusted under 35 U.S.C. 154(b) by 0 days.

(21) Appl. No.: 09/763,969

(22) PCT Filed: Jun. 28, 2000

(86) PCT No.: PCT/JP00/04266

§ 371 Date: Feb. 28, 2001

§ 102(e) Date: Feb. 28, 2001

(87) PCT Pub. No.: WO01/00702

PCT Pub. Date: Jan. 4, 2001

(30) Foreign Application Priority Data

Jun. 29, 1999 (JP) ............................. 11-184473
May 11, 2000 (JP) ............................. 12-139250

(51) Int. Cl.⁷ ..................... C08K 5/16; C08G 63/06
(52) U.S. Cl. ................. 524/717; 528/206; 528/219; 524/714; 524/718; 524/780; 524/781; 524/785; 524/798
(58) Field of Search ................ 528/206, 219; 524/714, 717, 718, 780, 781, 785, 798

(56) References Cited

FOREIGN PATENT DOCUMENTS

| JP | 4926264 | 8/1974 |
| JP | 58047079 | 3/1983 |
| JP | 59155469 | 9/1984 |
| JP | A59155469 | 9/1984 |
| JP | A841166 | 2/1996 |
| JP | 8041166 | 2/1996 |
| JP | 8053545 | 2/1996 |
| JP | 8302007 | 11/1996 |
| JP | A8302007 | 11/1996 |
| JP | 11323258 | 11/1999 |

OTHER PUBLICATIONS

Tonami et al., "Synthesis of a soluble polyphenol by oxidative polymerization of bisphenol–A using iron–salen complex as catalyst", *Polymer Bulletin*, 42, pp. 125–129, 1999.

*Primary Examiner*—Samuel A. Acquah
(74) *Attorney, Agent, or Firm*—Birch, Stewart, Kolasch & Birch, LLP

(57) ABSTRACT

A curable resin composition, which comprises a resin formed, in the presence of a transition metal complex, by polymerizing an oxidative-polymerizable compound that contains a phenol-compound-containing vegetable oil. A method for producing a curable resin composition comprising a resin formed, in the presence of a catalyst, by polymerizing an oxidative-polymerizable compound that contains a phenol-compound-containing vegetable oil, wherein the catalyst is a transition metal complex. The curable resin composition is useful as a raw material for a urushi-like coating, a friction material, a brake lining material, a brake pad material, a material for forming a coating film, a compound for a recording material, a raw material for an ink, a raw material for a coating,.a raw material for a adhesive, a raw material for an epoxy resin, a raw material for a photoresist or antioxidant, and a starting material for a functional polymer.

12 Claims, No Drawings

RESIN COMPOSITION AND PROCESS FOR PRODUCING THE SAME

This application is the national phase under 35 U.S.C. §371 of PCT International Application No. PCT/JP00/04266 which has an International filing date of Jun. 28, 2000, which designated the United States of America.

TECHNICAL FIELD

The present invention relates to a resin composition and a method for producing the same, and in particular to a curable resin composition useful as a raw material for urushi(oriental lacquer)-like coating, a material for forming a coating film, a compound for recording material, a raw material for ink, a raw material for coating, a raw material for adhesive, a raw material for an epoxy resin, a raw material for photoresist, a raw material for antioxidant, a molding material, a raw material for laminated material, a raw material for adhesive, a raw material for binder, a raw material of a phenol resin for casting, a raw material of a phenol resin for rubber blending, and a raw material of a phenol resin for fiber plate; and a method for producing the same.

BACKGROUND ART

A wide variety of a phenol-compound-containing vegetable oil are known, among which urushiol, thitsiol, laccol, and cardanol, which are all obtained from sap of an Anacardiaceae plant, have been used as coatings (raw material for resin for dyes). Urushiol, thitsiol, or laccol forms a cured coating film at room temperature by an enzymatic catalyst (laccase) contained in the sap. The enzymatic catalyst is labile to heat, generally, when these resins are heated at 70° C. or more, the enzyme is inactivated, to reduce the catalytic activity, thus preventing the formation of a cured film, but the resins can be cured at about 130° C. or more. The cured coating film is not only excellent in hardness, with excellent in flexibility, but also in beauty, such as gloss, so it has been used for producing urushi ware since ancient times. Further, a urushi coating called kuro-urushi is made up of about 95% or more solids, the remaining being water, and thus the urushi coating can be regarded not only as a solvent-free type coating or a high-solid coating of a room temperature-curing type, but also as an organic coating film having high durability, as can be seen in lacquered remains artifacts as old as 1000 years or more. Further, the urushi coating can also be regarded as a coating with little affection on the natural environment, because, unlike synthetic resin coatings, the urushi coating neither uses a large amount of organic solvent nor requires high temperatures for curing. As described above, the urushi coating is an ideal coating at present, when the consciousness of global environmental problems is increasing. However, there are the problems that the urushi is produced only a small amount; it is expensive, and it is poison for the skin, etc.

On the other hand, a cashew nut shell liquid, obtained from the Anacardiaceae cashew tree (*Anacardium occidentale*), is produced in a large amount; it is inexpensive; it occurs as a by-product in preparation of edible kernel, and it is industrially useful as a urushi-like coating and a friction material (brake linings, brake pads), etc.

The cashew nut shell liquid contains a phenol compound such as anacardic acid which is a major component. The number of carbon atoms in the side chain of this compound is 15, and the number of an unsaturated bond in the side chain is 0 to 3 (average=about 2). Additionally, it is known that cardanol, cardol, 2-methyl cardol, and the like, are contained in the cashew nut shell liquid. The cashew nut shell liquid may be used as such for industrial purposes, but a material whose major component is cardanol, which is obtained by heat-treating the cashew nut shell liquid, to decarbonate a carboxyl group in anacardic acid, is generally used as a raw material for industry.

This cashew nut shell liquid (including the heat-treated material) is generally converted into cashew varnish for use in the various utilities described above, and, as can be seen from the extreme similarity in structure between cardanol and urushiol mentioned above, the cashew nut shell liquid has been used as a substitute for urushi. In the case of the cashew nut shell liquid unlike urushi, however, the curing reaction does not proceed by the enzymatic catalyst contained in the sap, and therefore, hexamethylenetetramine, which is a condensate of formaldehyde, and ammonia, or of formalin is reacted with the raw oil whose major component is cardanol, to produce cashew varnish (cardanol prepolymer). Then, a metal drier usually used in an oily coating is added thereto, as a catalyst, to oxidize the site of side-chain olefins, and other materials, such as predetermined pigments, etc., are mixed therewith, to give a general cashew resin coating as an oxidative-polymerizable coating. The cashew resin coating produced in this manner may cause the generation of formalin (formaldehyde), which is highly toxic to the human body, not only during the production process but also after a product is formed therefrom. However, the consciousness toward environmental problems has increased in recent years, and from the viewpoint of deodorization of the living environment and safety, health, etc., for the human body, there is a demand for a synthesis process that does not use highly toxic formalin (formaldehyde) in the cashew coating, as well as for development of a resin that does not generate formalin (formaldehyde).

Further, the phenol compound in the vegetable oil, such as the cashew nut shell liquid, generally have an unsaturated aliphatic group, such as an alkenyl group in the side chain, and in consideration of using the aforementioned phenol compound as an oxidative-polymerizable resin for a coating, which resin is curable at a room temperature, it is important that the reaction be suitably regulated so that the side chain in the phenol compound do not react during the polymerization reaction. However, when the polymerization reaction was carried out using a conventional catalyst without using formalin, hexamethylenetetramine, etc., it is difficult to regulate the reaction as only the site of the aromatic ring having a phenolic hydroxyl group undergoes oxidative polymerization. For example, JP-A-58-47079 describes a method for producing cashew dust by adding an acid to a cashew nut shell liquid, and then heat-polymerizing it, and then curing and grinding it, and in this process, a polymer called cashew dust, which is insoluble in solvent, is obtained, and it is not usable as a coating resin. Even if the product is not the dust but a polymer which is soluble in an organic solvent, the polymerization reaction proceeds in an alkenyl group in the side chain in the cashew nut shell liquid (shown in Comparative Example 2 below), and thus the reactivity of the remaining phenol site, which do not react yet, is utilized to prepare a cured product therefrom, but aldehydes, such as formalin, etc., are used often for linking the phenol site, so it is problematic that the toxicity of aldehyde cannot be solved.

On the other hand, it have already been known that phenols can be polymerized using an iron complex as the catalyst in the presence of oxygen (e.g., JP-A-49-26264). Further, it have already been known that phenols can be polymerized using a transition metal complex as the catalyst in the presence of peroxides (e.g., JP-A-8-53545 and Polymer Bulletin, 42, 125 (1999)). In these processes, however, the reaction materials are phenol compounds themselves, and these prior art documents do not show any example in which a phenol-compound-containing vegetable oil are used as a monomer component. Further, these prior art examples do not describe about a production of a curable resin composition derived from a vegetable oil by oxidative polymerization of only phenolic hydroxyl group, in a vegetable oil of nature origin containing multiple phenol compounds having an unsaturated aliphatic group such as an alkenyl group in the side chain.

Further, in Japanese Patent No. 3030363, the present inventors revealed a liquid resin formed by polymerizing a cashew nut shell liquid by use of an enzymatic catalyst, but the catalyst for obtaining the resin was not a transition metal complex.

The present invention relates to a resin composition and a method for producing the same, and it provides a curable resin composition useful as a raw material for urushi-like coatings, a friction material, a brake lining material, a brake pad material, a material for formation of coating films, a compound for recording materials, a raw material for ink, a raw material for coatings, a raw material for adhesives, a raw material for epoxy resin, a raw material for photoresist or antioxidants, and a starting material for functional polymers, and a method for producing the same.

The above-mentioned and other objects, features and advantages of the present invention will become more apparent from the following descriptions.

DISCLOSURE OF INVENTION

The present invention relates to a curable resin composition comprising a resin formed in the presence of a transition metal complex by polymerizing an oxidative-polymerizable compound that contains a phenol-compound-containing vegetable oil.

BEST MODE FOR CARRYING OUT THE INVENTION

Hereinafter, the present invention is described in more detail.

A wide variety of a phenol-compound-containing vegetable oil used in the present invention are known (those described in e.g. Chem. Soc. Rev., 8, 499 (1979)), and those vegetable oils derived from each of the genera Anacardicae, Gymnospermae, Compositae, Lichens, and Proteacae can be used. Examples of phenol compounds in the phenol compound-containing vegetables oils include anacardic acid, anagiganoic acid, pelandjauic acid, ginkgoic acid, ginkgophosphoric acid, cardanol, cardol, methyl cardol, urushiol, thitsiol, rhengol, laccol etc. The total content of a variety of these phenol compounds in the vegetable oils used in the present invention is generally 50% by weight or more, preferably 70% by weight or more. Specifically, such vegetable oils include a cashew nut shell liquid obtained from a cashew tree (*Anacardium occidentale*).

This cashew nut shell liquid contains the whole of viscous liquids extracted from cashew nuts is born by the cashew tree. The components in the cashew nut shell liquid are not particularly limited, and include compounds such as anacardic acid, cardanol, cardol and methyl cardol, and preferable include a cashew nut shell liquid whose major component is cardanol obtained by high-temperature treatment of cashew oil whose major component is anacardic acid. These components are monovalent phenol alkyl or alkenyl derivatives, and the alkenyl group in the side chain consists of monoene, diene and triene, and may also be used as a mixture thereof in the present invention. In the present invention, a viscous liquid extracted from cashew nuts may be used as it is or after purification or treatment such as modification. In the case of the cashew Tn, nut shell liquid containing anacardic acid, it is possible that the hydroxyl group and carboxyl group in anacardic acid forms a chelate with a transition metal in the transition metal complex used in the present invention, and thus the cashew nut shell liquid whose major component is cardanol can be preferably used.

The phrase "major component is cardanol" means that cardanol presents at an amount of generally 80% by weight or more in the cashew nut shell liquid.

Further, a phenol-compound-containing vegetable oil of nature origin, such as a cashew nut shell liquid, are used preferably as the phenol-compound-containing vegetable oil in the producing process of the present invention, but besides the vegetable oils described above, various oxidative-polymerizable compounds, such as phenols, naphthols, and aromatic amines, can be contained to carry out the copolymerization reaction. The phenols, naphthols and aromatic amines, and the amounts of use thereof can be selected in various physical properties demanded according to the use and object of the resulting vegetable oil polymers containing phenol compounds, and these materials can be used singly or in combination thereof. Although the ratio of compounds used as such copolymerization reaction components is arbitrary, the amount of the phenols and naphthols is generally 5000 mol % or less, preferably 500 mol % or less, most preferably 100 mol % or less, relative to the phenol-compound-containing vegetable oil (relative to the total of phenol compounds contained therein), further, the amount of the aromatic amines is generally 5000 mol % or less, preferably 500 mol % or less, and most preferably 100 mol % or less.

Such phenols include, for example, alkyl phenols such as o-cresol, m-cresol, p-cresol, p-octyl phenol, p-dodecyl phenol, 2,3-dimethyl phenol, 2,4-dimethyl phenol, 2,5-dimethyl phenol, 2,6-dimethyl phenol, 3,4-dimethyl phenol, 3,5-dimethyl phenol, o-ethyl phenol, m-ethyl phenol, 2,4,6-dimethyl phenol, p-t-butyl phenol, 2,4-di-t-butyl phenol, 2,6-di-t-butyl phenol and p-t-amyl phenol, polyvalent phenols such as hydroquinone, catechol, resorcinol, pyrogallol, urushiol, thitsiol and laccol, halogenated phenols such as o-chlorophenol, m-chlorophenol, p-chlorophenol, 2,4,6-trichlorophenol, o-bromophenol, m-bromophenol, p-bromophenol, o-fluorophenol, m-fluorophenol and p-fluorophenol, amino phenols such as o-amino phenol, m-amino phenol and p-amino phenol, bisphenol A, p-(α-cumyl) phenol, p-phenyl phenol, guaiacol, guethol, and phenol.

Specific examples of the naphthols include α-naphthol, β-naphthol, 1,4-dihydroxynaphthalene, etc.

Specific examples of the aromatic amines include aniline, o-anisidine, p-anisidine, 2,4-xylidine, 3,4-xylidine, p-cresidine, 4,4'-diamino-3,3'-diethyl diphenyl methane, 4,4'-diaminobenzanilide, diaminodiphenyl ether, 3,3'-dimethyl-4,4'-diaminodiphenyl methane, sulfanilic acid, etc.

In the method for producing a curable resin composition comprising a resin formed, in the presence of a transition metal complex catalyst, by polymerizing an oxidative-polymerizable compound that contains a phenol-compound-containing vegetable oil of the present invention, it is considered that the polymerization mechanism is the radical coupling reaction of phenoxy radicals formed by oxidation reaction (dehydrogenation reaction) of phenol compounds in the vegetable oils, by the transition metal complex. This phenoxy radical has a resonance structure (carbon radical and oxygen radical), and it is considered that these phenoxy resonance radicals are very unstable and immediately subjected to coupling reaction of two molecules (dimerization reaction). The polymerization of dimers or more is considered to proceed as follows: The dimers, formed by the coupling reaction described above, further undergo oxidation reaction (dehydrogenation reaction) by the transition metal complex to form phenoxy radicals which in turn are subjected to coupling with phenoxy radicals of monomers or with phenoxy radicals of dimers or more oligomers.

Further, it is considered that the formation of phenoxy radicals can occur due to radical substitution reaction between phenoxy radicals of monomers, and monomers or oligomers, and phenoxy radicals are also formed in this case in the same manner as described above, and thus the polymerization reaction is considered to proceed in the same manner as described the above. Accordingly, the resin of a phenol-compound-containing vegetable oil, which is obtained in the present invention, comprises the polymers having units bound via oxyphenylene to phenylene bonds at random in the site of the aromatic rings of a phenol-compound-containing vegetable oil, wherein aliphatic unsaturated double bonds in their side chain remain. The degree of the remaining aliphatic unsaturated double bond in the side chain vary according to various polymerization conditions such as the type and amount of the transition metal complex, which is used, the reaction temperature and the solvent, but is generally 70% or more, preferably 80 to 100%, more preferably 100%.

By selecting various conditions for the polymerization reaction in the present invention, it is possible to regulate whether the double bonds in the side chain are allowed to remain, or whether a part or most of the double bonds are crosslinked. Specifically, whether the curable resin composition can be obtained or not is determined depending on the type of the reaction solvent and the amount of the transition metal complex relative to the phenol compounds in vegetable oils. The iodine value of the resin composition of the present invention is generally 50 to 500, preferably 100 to 500.

The transition metal complex, which is used in the present invention, can be used singly or as a mixture thereof. Its amount may be used in an arbitrary amount, and suitably regulated depending on the catalytic activity of the transition metal complex which is used in the present invention, but it can be used generally in the order of 0.0001 to 30 mol %, preferably 0.01 to 10 mol % or thereabout, relative to the phenol-compound-containing vegetable oil. Further, as the catalyst, the transition metal compound can be mixed with its corresponding ligand during the reaction. In this case, the ligand may be used in an arbitrary amount, however, generally preferably in an about 0.1 to 10 molar equivalence relative to the transition metal.

The transition metal atom in the transition metal complex of the present invention is a transition metal atom in the groups 3A to 7A, 8, 1B and 2B in the elemental periodic table (IUPAC nomenclature in inorganic chemistry, Revised Ed., 1989). It is preferably a transition metal atom in the first transition element series, more preferably iron, cobalt, vanadium, chromium, manganese, nickel, copper, or vanadium oxide. It is more preferably iron, cobalt, copper or manganese.

The ligand in the transition metal complex of the present invention is a ligand whose ligand atom is a nitrogen atom, phosphorus atom, oxygen atoms, or sulfur atom, respectively.

The ligand in the present invention refers to a molecule or an ion which is bound via a coordinate bond to a certain atom, as described in "Kagaku Daijiten (Large Dictionary of Chemistry)" (First Ed., Tokyo Kagaku Dojin, 1989). The atom participating directly in the coordinate bond is called a ligand atom. Monodentate ligand, bidentate ligand, tridentate ligand, quadridentate ligand, and quinquedentate ligand are ligands wherein each number of ligand atoms is 1, 2, 3, 4 and 5, respectively.

In the transition metal complex of the present invention, the number of transition metal atoms per said ligand may be one or more, preferably one or more and not more than the number of ligand atoms in the ligand, and more preferably one.

The ligand in the transition metal complex of the present invention is not particularly limited insofar as the ligand has an ability to polymerize the phenol-compound-containing vegetable oil component, and the bidentate ligand, quadridentate ligand, and quinquedentate ligand can be preferably used.

Specific examples of the bidentate ligand include anions obtained by removing one or more protons from ethylene glycol, 1,2-propane diol, 1,3-propane diol, 1,2-butane diol, 2,3-butane diol, 2,3-dimethyl-2,3-butane diol, 1,2-cyclohexane diol, 1,2-ethane dithiol, 1,3-propane dithiol, catechol, hydroxyacetic acid, 2-hydroxypropionic acid, 2-hydroxybutyric acid, ethyl hydroxyacetate, hydroxyacetone, 2-ketopropionic acid, 2-ketobutyric acid, ethyl 2-ketopropionate, acetyl acetone, salicylaldehyde, salicylic acid, ethyl acetoacetate, malonic acid, diethyl malonate, glycine, alanine, valine, leucine, phenyl alanine, monoethanol amine, 3-amino-1-propanol, 2-amino-1-propanol, 1-amino-2-propanol, 3-amino-2-butanol, 3-amino-2,3-dimethyl-2-butanol, 2-amino-1-cyclohexanol, N-methyl ethanol amine, N-ethyl ethanol amine, N-propyl ethanol amine, N-butyl ethanol amine, N-phenyl ethanol amine, N-methyl propanol amine, N-phenyl propanol amine, N,N-dimethyl ethanol amine, N,N-diethyl ethanol amine, N-salicylidene methyl amine, N-salicylidene ethyl amine, N-salicylidene propyl amine, N-salicylidene butyl amine, N-salicylidene aniline, 4-(N-methylimino)-2-pentanone, 4-(N-ethylimino)-2-pentanone, 4-(N-propylimino)-2-pentanone, 4-(N-phenylimino)-2-pentanone, 2-(N-methylimino) propionic acid, 3-(N-methylimino)propionic acid, ethyl 3-(N-methylimino)propionate, 2-(N-methylimino) butyric acid, 2-(N-methylimino)propanol, etc.; and neutral molecules such as 2,3-butane dione, 3,4-hexane dione, 2,5-dimethyl-3,4-hexane dione, 2,2-dimethyl-3,4-hexane dione, 2,2,5,5-tetramethyl-3,4-hexane dione, 1,2-cyclohexane dione, 2-(N-methylimino)-3-butanone, 2-(N-ethylimino)-3-butanone, 2-(N-propylimino)-3-butanone, 2-(N-butylimino)-3-butanone, 2-(N-phenylimino)-3-butanone, 3-(N-methylimino)-3-hexanone, 2-(N-methylimino)-cyclohexanone, methyl 2-(N-methylimino)-propionate, ethyl 2-(N-methylimino)-butyrate, etc.

Specific examples of the quadridentate ligand include tris(2-pyridyl methyl) amine, tris(2-imidazolyl methyl) amine, tris(1-methyl-2-imidazolyl methyl)amine, tris(2-benzimidazolyl methyl)amine, tris(2-benzoxazolyl methyl) amine, tris(2-benzthiazolyl methyl)amine, tris(1-pyrazolyl methyl)amine, tris(3,5-dimethyl-1-pyrazolyl methyl)amine, tris(3,5-dipropyl-1-pyrazolyl methyl)amine, tris(3,5-diphenyl-1-pyrazolyl methyl)amine, nitrilotriacetic acid, nitrilotriethanol, nitrilotri-1-propanol, tris(2-pyridyl-2-ethyl)amine, tris(1-pyrazolyl-2-ethyl)amine, N-(2-mercaptoethyl)-N,N-diethanol amine, N-(diphenyl phosphinoethyl)-N,N-diethanol amine, triethylene glycol, tripropylene glycol, triethylene tetramine, N,N'''-dimethyl triethylene tetramine, -N,N,N''',N'''-tetramethyl triethylene tetramine, N,N'-bis(2-hydroxyethyl)ethylene diamine, N,N'-bis(3-hydroxypropyl)ethylene diamine, N,N'-ethylene diamine diacetic acid, N,N'-bis(2-pyridyl methyl)ethylene diamine, N,N'-bis(2-imidazolyl methyl)ethylene diamine, N,N'-bis(2-benzimidazolyl methyl)ethylene diamine, N,N'-bis(2-mercaptoethyl)ethylene diamine, N,N'-bis(diphenyl phosphinoethyl)ethylene diamine, N,N'-disalicylidene ethylene diamine, N,N'-bis(1-methyl-3-oxobutylidene) ethylene diamine, N-2-hydroxyethyl-N'-salicylidene ethylene diamine, N-2-hydroxyethyl-N'-salicylidene-1,3-propylene diamine, N-3-hydroxypropyl-N'-salicylidene-1,3-propylene diamine, N-3-hydroxypropyl-N'-salicylidene ethylene diamine, N-2-dimethyl aminoethyl-N'-salicylidene ethylene diamine, N-2-pyridyl methyl-N'-salicylidene ethylene diamine, N,N'-bis(2-amino-3-benzylidene)ethylene diamine, 1-(diacetylmonoxime imino)-3-(diacetyl monoxymatoimino)propane, 12-crown-4,1,4,8,11-tetraazacyclotetradecane, 1,4,8,11-tetraazacyclotetradecane-5,7-dione, 1,4,8,11-tetramethyl-1,4,8,11-tetraazacyclotetradecane, 1,4,7,10-tetrathiacyclododecane, 2,3,9,10-tetramethyl-1,4,8,11-tetraazacyclotetradeca-1,3,8,10-tetraene, 5,7,12,14-tetramethyl-1,4,8,11-tetraazacyclotetradeca-4,6,11,13-tetraene, porphyrin, phthalocyanine, etc., or anions obtained by removing one or more protons from the aforementioned compounds.

Further, specific examples of the quinquedentate ligand include tetraethylene glycol, tetrapropylene glycol, tetraethylene pentamine, N,N'''-dimethyl tetraethylene pentamine, N,N,N''',N'''-tetramethyl tetraethylene pentamine, N,N''-bis(2-hydroxyethyl)diethylene triamine, N,N''-bis(3-hydroxypropyl)diethylene triamine, N,N''-diethylene triamine, diacetic acid, N,N''-bis(2-pyridyl methyl) diethylene triamine, N,N''-bis(2-imidazolyl methyl) diethylene triamine, N,N''-bis(2-benzimidazolyl methyl) diethylene triamine, N,N''-bis(2-mercaptoethyl) diethylene triamine, N,N''-bis(diphenyl phosphinoethyl) diethylene triamine, N,N''-disalicylidene diethylene triamine, N,N''-bis(1-methyl-3-oxobutylidene)diethylene triamine, N-2-hydroxyethyl-N''-salicylidene diethylene triamine, N-3-hydroxypropyl-N''-salicylidene diethylene triamine, N-3-hydroxypropyl-N'-salicylidene ethylene diamine, N-2-dimethyl aminoethyl-N''-salicylidene diethylene triamine, N-2-pyridyl methyl-N''-salicylidene diethylene triamine, N,N''-bis(2-amino-3-benzylidene) diethylene triamine, 1,5-bis(salicylidene amino)-3-pentanol, 2,6-bis[N-(2-hydroxyethyl)iminoethyl]-4-methyl phenol, 2,6-bis[N-(3-hydroxypropyl)iminomethyl]-4-methyl phenol, 2,6-bis[N-(2-hydroxyphenyl)iminomethyl]-4-methyl phenol, 2,6-bis[N-(2-pyridyl methyl)iminomethyl]-4-methyl phenol, 2,6-bis[N-(2-pyridyl ethyl)iminomethyl]-4-methyl phenol, 2,6-bis[N-(2-dimethylaminoethyl)iminomethyl]-4-methyl phenol, 2,6-bis[N-(2-pyridyl methyl) aminomethyl]-4-methyl phenol, 2,6-bis[N-(2-pyridyl ethyl)aminomethyl] phenol, 15-crown-5,1,4,7,10,13-pentathiacyclopentadecane, etc., or anions obtained by removing one or more protons from the aforementioned compounds.

The ligand atom in the ligand in the transition metal complex of the present invention is preferably a nitrogen atom and/or an oxygen atom.

The transition metal complex of the present invention is preferably a transition metal complex represented by the following formula (I), (II), (III), or (IV):

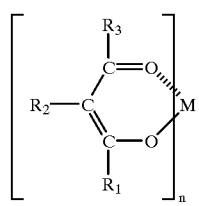

(I)

wherein M represents a residue containing a transition metal atom; $R_1$ and $R_3$ each independently represent a hydrogen atom, a hydrocarbon group, a substituted hydrocarbon group, $O^-$, a hydrocarbon oxy group, a substituted hydrocarbon oxy group, an amino group, or a substituted amino group; $R_2$ represents a hydrogen atom, a hydrocarbon group, a substituted hydrocarbon group, a hydrocarbon oxy group, a substituted hydrocarbon oxy group, a hydrocarbon oxycarbonyl group, a substituted hydrocarbon oxycarbonyl group, a cyano group, a nitro group, or a halogen atom; $R_1$ and $R_2$, and/or $R_2$ and $R_3$ may form a ring; and n is an integer of 1 to

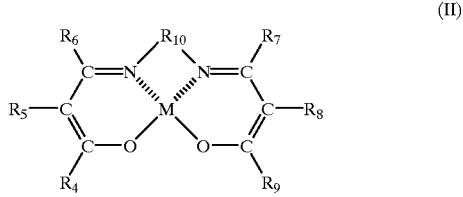

(II)

wherein M represents a residue containing a transition metal atom; $R_4$ and $R_9$ each independently represent a hydrogen atom, a hydrocarbon group, a substituted hydrocarbon group, $O^-$, a hydrocarbon oxy group, a substituted hydrocarbon oxy group, an amino group, or a substituted amino group; $R_5$ and $R_8$ each independently represent a hydrogen atom, a hydrocarbon group, a substituted hydrocarbon group, a hydrocarbon oxy group, a substituted hydrocarbon oxy group, a hydrocarbon oxycarbonyl group, a substituted hydrocarbon oxycarbonyl group, a cyano group, a nitro group, or a halogen atom; $R_6$ and $R_7$ each independently represent a hydrogen atom, a hydrocarbon group, a substituted hydrocarbon group, or $O^-$; $R_{10}$ represent a divalent hydrocarbon group or substituted hydrocarbon group, and $R_4$ and $R_5$, and/or $R_8$ and $R_9$ may form a ring;

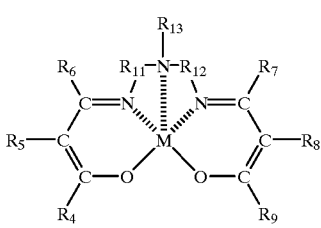

(III)

wherein M represents a residue containing a transition metal atom; $R_4$ and $R_9$ each independently represent a, hydrogen atom, a hydrocarbon group, a substituted hydrocarbon group, $O^-$, a hydrocarbon oxy group, a substituted hydrocarbon oxy group, an amino group, or a substituted amino group; $R_5$ and $R_8$ each independently represent a hydrogen atom, a hydrocarbon group, a substituted hydrocarbon group, a hydrocarbon oxy group, a substituted hydrocarbon oxy group, a hydrocarbon oxycarbonyl group, a substituted hydrocarbon oxycarbonyl group, a cyano group, a nitro group, or a halogen atom; $R_6$ and $R_7$ each independently represent a hydrogen atom, a hydrocarbon group, a substituted hydrocarbon group, or $O^-$; $R_{11}$ and $R_{12}$ each represent a divalent hydrocarbon group or substituted hydrocarbon group; $R_{13}$ represents a hydrogen atom, a hydrocarbon group or a substituted hydrocarbon group; and $R_4$ and $R_5$, and/or $R_8$ and $R_9$ may form a ring,

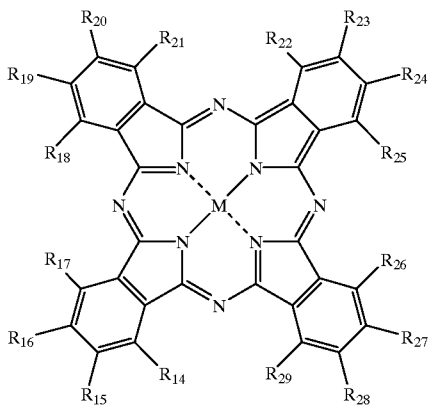

(IV)

wherein M represents a residue containing a transition metal atom; $R_{14}$ to $R_{29}$ each independently represent a hydrogen atom, a hydrocarbon group, a substituted hydrocarbon group, $O^-$, a hydrocarbon oxy group, a substituted hydrocarbon oxy group, an amino group, or a substituted amino group, a hydrocarbon oxycarbonyl group, a substituted hydrocarbon oxycarbonyl group, a cyano group, a nitro group, or a halogen atom, or $O^-$; $R_{14}$ and $R_{15}$, and/or $R_{15}$ and $R_{16}$, and/or $R_{16}$ and $R_{17}$, and/or $R_{18}$ and $R_{19}$, and/or $R_{19}$ and $R_{20}$, and/or $R_{20}$ and $R_{21}$, and/or $R_{22}$ and $R_{23}$, and/or $R_{24}$ and $R_{25}$, and/or $R_{26}$ and $R_{27}$, and/or $R_{27}$ and $R_{28}$, and/or $R_{28}$ and $R_{29}$ may form a ring.

The substituted hydrocarbon oxy group in the aforementioned formula (I), (II), (III), or (IV) is a hydrocarbon oxy group substituted with a halogen atom, alkoxy group, amino group, etc., and specific examples thereof include a trifluoromethoxy group, 2-t-butyloxyethoxy group, 3-diphenyl aminopropoxy group, etc.

The substituted amino group in the aforementioned formula (I), (II), (III), or (IV) is preferably a substituted amino group having 1 to 20 total carbon atoms, and specific examples thereof include a methyl amino group, ethyl amino group, propyl amino group, butyl amino group, phenyl amino group, dimethyl amino group, diethyl amino group, dipropyl amino group, dibutyl amino group, methyl ethyl amino group, methyl propyl amino group, methyl butyl amino group, diphenyl amino group, dinaphthyl amino group, etc.

The hydrocarbon oxycarbonyl group in the aforementioned formula (I), (II), (III), or (IV) is preferably a hydrocarbon oxycarbonyl group having 1 to 20 total carbon atoms, and specific examples thereof include a methoxycarbonyl- group, ethoxycarbonyl group, propoxycarbonyl group, t-butyloxycarbonyl group, phenoxycarbonyl group, etc.

The substituted hydrocarbon oxycarbonyl group in the aforementioned formula (I), (II), (III), or (IV) is a hydrocarbon oxycarbonyl group substituted with a halogen atom, alkoxy group, amino group, etc., and specific examples thereof include a trifluoromethoxy carbonyl group, 2-t-butyloxyethoxy carbonyl group, 3-diphenyl aminopropoxy carbonyl group, etc.

The halogen atom in the aforementioned formula (I), (II), (III), or (IV) is preferably a chlorine atom, bromine atom, or iodine atom, more preferably chlorine atom or bromine atom.

In the aforementioned formula (II) or (III), $R_{10}$, $R_{11}$, and $R_{12}$ are divalent hydrocarbon groups or substituted hydrocarbon groups, and specific examples thereof include alkylene groups such as methylene group, 1,2-ethylene group, 1,2-propylene group, 1,3-propylene group, 1,4-butylene group, etc., cycloalkylene groups such as 1,2-cyclopentylene group, 1,2-cyclohexylene group, etc., and arylene groups such as phenylene group, naphthylene group, etc., and preferable examples include a methylene group, ethylene group, 1,3-propylene group and 1,2-cyclohexylene group.

Specific examples of the bidentate ligand in the transition metal complex represented by the aforementioned formula (I) include acetyl acetone, 2,2,6,6-tetramethyl-3,5-heptane dione, trifluoroacetyl acetone, dibenzoyl methane, etc., or anions and the like obtained by removing one or more protons therefrom. Preferably, acetyl acetone can be used.

Specific examples of the quadridentate ligand in the transition metal complex represented by the aforementioned 3formula (II) include N,N'-disalicylidene ethylene diamine, N-(3-oxopentylidene)-N'-salicylidene ethylene diamine, N,N'-bis(3-oxobutylidene)ethylene diamine, N,N'-bis(3-aoxobutylidene)-1,3-propane diamine, N,N'-bis(3-oxobutylidene)-1,2-phenylene diamine, N,N'-bis(1-methyl-3-oxobutylidene)ethylene diamine, N,N'-bis(3-oxopentylidene)ethylene diamine, N,N'-bis(3-oxohexylidene)ethylene diamine, N,N'-bis(4-methyl-3-oxopentylidene)ethylene diamine, N,N'-bis(4,4-dimethyl-3-oxopentylidene)ethylene diamine, N,N'-bis(4-phenyl-3-oxobutylidene)ethylene diamine, N,N'-bis(4-trifluoromethyl-3-oxobutylidene)ethylene diamine, N,N'-bis(2-cyano-3-oxobutylidene)ethylene diamine, N,N'-bis(2-cyano-3-oxobutylidene)ethylene diamine, N,N'-bis(2-nitro-3-oxobutylidene)ethylene diamine, N,N'-bis(2-carboxylethylidene)ethylene diamine, N,N'-bis[2-(methoxycarbonyl)ethylidene]ethylene diamine, N,N'-5 bis[2-(dimethylaminocarbonyl)ethylidene]ethylene diamine, N,N'-(1,2-ethylene)-bis(salicylic acid amide), N,N'-(1,2-ethylene)-bis(malonic acid monomethyl monoamide), etc., or anions, etc., obtained by removing one or more protons therefrom.

Specific examples of the quinquedentate ligand in the transition metal complex represented by the aforementioned formula (III) include N,N"-disalicylidene diethylene triamine, N-(3-oxopentylidene)-N"-salicylidene diethylene triamine, N,N"-bis(3-oxobutylidene)diethylene triamine, N,N"-bis(3-oxobutylidene)-dipropylene triamine, N,N"-bis(3-oxobutylidene)-N'-methyl dipropylene triamine, N,N"-bis(1-methyl-3-oxobutylidene)-N'-methyl dipropylene triamine, N,N"-bis(3-oxopentylidene)-N'-methyl dipropylene triamine, N,N"-bis(3-oxohexylidene)-N'-methyl dipropylene triamine, N,N"-bis(4-methyl-3-oxopentylidene)-N'-methyl dipropylene triamine, N,N"-bis(4,4-dimethyl-3-oxopentylidene)-N'-methyl dipropylene triamine, N,N"-bis(4-phenyl-3-oxobutylidene)-N'-methyl dipropylene triamine, N,N"-bis(4-trifluoromethyl-3-oxobutylidene)-N'-methyl dipropylene triamine, N,N"-bis(2-cyano-3-oxobutylidene)-N'-methyl dipropylene triamine, N,N"-bis(2-cyano 3-oxobutylidene)-N'-methyl dipropylene triamine, N,N"-bis(2-nitro-3-oxobutylidene)-N'-methyl dipropylene triamine, N,N"-bis(2-carboxylethylidene)-N'-methyl dipropylene triamine, N,N"-bis[2-(methoxycarbonyl)ethylidene]-N"-methyl dipropylene triamine, N,N"-bis[2-(dimethylaminocarbonyl) ethylidene]-N'-methyl dipropylene triamine, N,N'-(3-aza-1,5-pentylenelene)-bis(salicylic acid amide), N,N'-(3-aza-1,5-pentylenelene)-bis(malonic acid monomethyl monoamide), etc., or anions, etc., obtained by removing one or more protons therefrom.

Further, the transition metal complex represented by the aforementioned formula (II) or (III) is more preferably the transition metal complex represented by the following formula (V) or (VI):

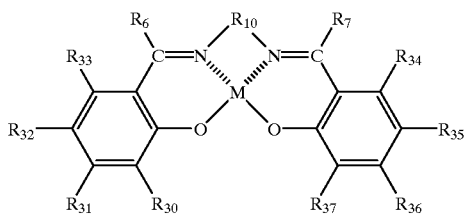

(V)

wherein M represents a residue containing a transition metal atom; $R_6$ and $R_7$ each independently represent a hydrogen atom, a hydrocarbon group, or a substituted hydrocarbon group; $R_{10}$ represents a divalent hydrocarbon group or substituted hydrocarbon group; $R_{30}$ to $R_{37}$ each independently represent a hydrogen atom, a hydrocarbon group, a substituted hydrocarbon group, a hydrocarbon oxy group, a substituted hydrocarbon oxy group, a substituted amino group, a nitro group, or a halogen atom,

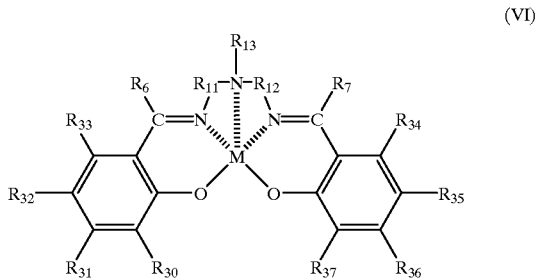

(VI)

wherein M represents a residue containing a transition metal atom; $R_6$, $R_7$, or $R_{13}$ each independently represent a hydrogen atom, a hydrocarbon group, or a substituted hydrocarbon group; $R_{11}$ and $R_{12}$ each independently represent a divalent hydrocarbon group or a substituted hydrocarbon group; $R_{30}$ to $R_{37}$ each independently represent a hydrogen atom, a hydrocarbon group, a substituted hydrocarbon group, a hydrocarbon oxy group, a substituted hydrocarbon oxy group, a substituted amino group, a nitro group, or a halogen atom.

M, the hydrocarbon group, the substituted hydrocarbon group, the divalent hydrocarbon group, or the substituted hydrocarbon group, the hydrocarbon oxy group, the substituted hydrocarbon oxy group, the substituted amino group, or the halogen atom, in the aforementioned formula (V) or (VI), include those exemplified in the aforementioned formula (II) or (III).

As $R_6$; $R_7$, $R_{10}$, and $R_{30}$ to $R_{37}$ in the aforementioned formula (V), it is more preferable that $R_6$ and $R_7$ are each independently a hydrogen atom or a hydrocarbon group, $R_{10}$ is an alkylene group, cycloalkylene group, or arylene group, and $R_{30}$ to $R_{37}$ are each independently a hydrogen atom, a hydrocarbon group, a halogenated hydrocarbon group, a hydrocarbon oxy group, a substituted amino group, a nitro group, a chlorine atom, or a bromine atom. Particularly preferably, $R_6$ and $R_7$ are each independently a hydrogen atom, a methyl group, or phenyl group, $R_{10}$ is a 1,2-ethylene group, 1,3-propylene group, 1,2-cyclohexylene group, or 1,2-phenylene group, and $R_{30}$ to $R_{37}$ are each independently a hydrogen atom, a methyl group, ethyl group, n-propyl group, iso-propyl group, n-butyl group, t-butyl group, benzyl group, trifluoromethyl group, methoxy group, dimethylamino group, nitro group, chlorine atom, or bromine atom.

As $R_6$, $R_7$, $R_{11}$ to $R_{13}$, and $R_{30}$ to $R_{37}$ in the aforementioned formula (VI), it is more preferable that $R_6$, $R_7$, and $R_{13}$ are each independently a hydrogen atom or a hydrocarbon group, $R_{11}$ and $R_{12}$ are each independently an alkylene group or an arylene group, and $R_{30}$ to $R_{37}$ are each independently a hydrogen atom, a hydrocarbon group, a halogenated hydrocarbon group, a hydrocarbon oxy group, a substituted amino group, a nitro group, a chlorine atom, or a bromine atom. Particularly preferably, $R_6$, $R_7$, and $R_{13}$ are each independently a hydrogen atom, a methyl group, or a phenyl group, $R_{11}$ and $R_{12}$ are each independently a 1,2-ethylene group, 1,3-propylene group, or 1,2-phenylene group, and $R_{30}$ to $R_{37}$ are each independently a hydrogen atom, a methyl group, ethyl group, n-propyl group, iso-propyl group, n-butyl group, t-butyl group, benzyl group, trifluoromethyl group, methoxy group, dimethylamino group, nitro group, chlorine atom, or bromine atom.

Specific examples of the quadridentate ligand in the transition metal complex represented by the aforementioned formula (IV) includes, phthalocyanine, 1,4,8,11,15,18,22,25-octacarboxy-29H, 31H-phthalocyanine, 1,8,15,22-tetraphenoxy-29H, 31H-phthalocyanine, 2,9,16,23-tetra-t-butyl-29H, 31H-phthalocyanine, tetrakis(4-cumyl phenoxy) phthalocyanine, 1,8,15,22-tetrakis(phenyl thio)-29H, 31H-phthalocyanine, 2,9,16,23-tetrakis(phenyl thio)-29H, 31H-phthalocyanine, 3,10,17,24-tetra-t-butyl-1,8,15,22-tetrakis-(dimethyl amino)-29H, 31H-phthalocyanine, phthalocyanine tetrasulfonic acid, 4',4''',4'''',4''''''-tetraza-29H, 31H-phthalocyanine, tetracarboxy phthalocyanine, octacarboxy phthalocyanine, naphthalocyanine, 2,11,20,29-tetra-t-butyl-2,3-naphthalocyanine, 5,14,23,32-tetraphenyl-2,3-naphthalocyanine, 5,9,14,18,23,27,32,36-octacarboxy-2,3-naphthalocyanine, etc., or anions, etc., obtained by removing protons therefrom. Preferably, phthalocyanine or naphthalocyanine can be used.

The transition metal complex of the present invention can be obtained by using general methods as described in e.g. "Jikeen kagaku koza 17—Inorganic Complex-Chelate Complex, Fourth Edition" (in Japanese), Maruzen Co., Ltd., (1991), page 302 etc. Said transition metal complex may be a previously synthesized complex, or the complex may be formed in the reaction system.

The structure of the transition metal complex of the present invention, excluding the ligand and the transition metal atom, is not particularly limited insofar as the catalytic performance is not inactivated. For example, a N,N'-di(salicylidene)ethylene diaminato iron (II) (also referred to hereinafter as Fe-salen or Fe (II)-salen) transition metal complex, using N,N'-disalicylidene ethylene diamine (also referred to hereinafter as salen) as the ligand and iron as the transition metal, is known easily to form μ-oxo-bis{(N,N'-disalicylidene ethylene diaminato iron (III))}, which is oxygen crosslinked compound in oxygen, and there are not any problems that this compound is used.

There are cases, which, in the transition metal complex of the present invention, require a counter ion to maintain electrical neutrality. As the counter anion, a conjugated base of Brensted acid is generally used, and specific examples thereof include fluoride ion, chloride ion, bromide ion, iodide ion, sulfate ion, nitrate ion, carbonate ion, perchlorate ion, tetrafluoroborate ion, hexafluorophosphate ion, methane sulfonate ion, trifluoromethane sulfonate ion, toluene sulfonate ion, acetate ion, trifluoroacetate ion, propionate ion, benzoate ion, hydroxide ion, oxide ion, methoxide ion, ethoxide ion, etc. As the counter cation, cations such as alkali metals and alkaline earth metals can be used as necessary. Further, the transition metal complex of the present invention may be coordinated with a solvent, etc., in the material of the complex, in the process for synthesizing, and/or in the process of oxidative polymerization.

A co-catalyst may be used to enhance the activity of the transition metal complex of the present invention. The co-catalyst includes amines, diketone complexes, metal halides, etc.

When the amine is used as the co-catalyst, its effects such as improvement of the polymerization activity can be expected as shown in Polymer Bulletin, 42, 125 (1999). As far as the amine species used does not have an effect on the activity of the transition metal complex, and is soluble in the phenol-compound-containing vegetable oil or in the reaction solvent, the amine is not particularly limited, and amine of public knowledge can be used. Specifically, tertiary amines such as pyridine, triethyl amine, 2,6-lutidine, N,N,N',N'-tetraethylene diamine can be used, and the amine is used in the range of preferably 0.001 to 50% by weight, more preferably 0.001 to 10% by weight, relative to the phenol-compound-containing vegetable oil as the material.

The diketone complex includes acetyl acetonato complexes of iron, cobalt, vanadium, chromium, manganese, or nickel. Specifically, bis(acetyl acetonato) cobalt (II), trisacetyl acetonato) cobalt (III), bis(acetyl acetonato) manganese (II), tris(acetyl acetonato) manganese (III), tris (acetyl acetonato) iron (III), bis(acetyl acetonato) oxovanadium (IV), etc., can be mentioned, and these compounds preferably are used in the range of 0.1 to 5 mol equivalent, more preferably 0.5 to 2 mol equivalent, relative to the transition metal complex, which is used.

Specific examples of the metal halides include cobaltous chloride, cobaltic chloride, etc., and these compounds preferably are used in the range of 0.1 to 5 mol equivalent, more preferably 0.5 to 2 mol equivalent, relative to the transition metal complex, which is used.

The oxidizing agent used in the present invention may be arbitrary, and preferably oxygen or peroxides can be used. Oxygen may be a mixture with an inert gas, and may be the air. Examples of the peroxides include hydrogen peroxide, t-butyl hydroperoxide, di-t-butyl peroxide, cumene hydroperoxide, dicumyl peroxide, peracetic acid, perbenzoic acid, etc. More preferably, a peroxide can be used, and hydrogen peroxide is particularly preferable.

When oxygen is used as the oxidizing agent in the present invention, it is used generally in equivalent to large excess relative to the phenol-compound-containing vegetable oil. When the peroxide is used, it is used generally in an amount of equivalent or more and 3 equivalents or less, preferably 0.8 to 2 equivalents, relative to the phenol-compound-containing vegetable oil.

The phrase "a solvent is substantially not used to carried out the polymerization reaction" in the present invention means that the solvent is used such that the concentration of the solvent in the phenol-compound-containing vegetable oil is preferably 0 to 10% by weight, more preferably 1 to 3% by weight, particularly preferably 0% by weight, and in this case, the reaction is carried out desirably at the temperature range at which the reaction medium remains fluid, and in case of using the cashew nut shell liquid, the reaction is carried out desirably at room temperature or more because its melting point is generally room temperature or less. However, when hydrogen peroxide is used as the oxidizing agent, hydrogen peroxide is used generally as 30%, 60%, or the like of aqueous hydrogen peroxide solution, the water content in hydrogen peroxide as the oxidizing agent is not regarded as the solvent in the present invention.

Further, the present invention can also be carried out even in the presence of a solvent. In case of using as a solvent, the solvent is not particularly limited insofar as it is inert to the phenol-compound-containing vegetable oil, is fluid at the reaction temperature, and is capable of dissolving the curable resin composition, which is produced. Examples of the solvent include aromatic hydrocarbons such as benzene, toluene, xylene, etc.; linear and cyclic aliphatic hydrocarbons such as heptane, cyclohexane, etc.; halogenated hydrocarbons such as chlorobenzene, dichlorobenzene, dichloromethane, etc.; nitriles such as acetonitrile, benzonitrile, etc.; alcohols such as methanol, ethanol, n-propyl alcohol, iso-propyl alcohol, etc.; ethers such as dioxane, tetrahydrofuran, ethylene glycol dimethyl ether, etc.; amides such as N,N-dimethyl formamide, N-methyl pyrrolidone, etc.; nitro compounds such as nitromethane, nitrobenzene, etc.; and water, etc. These may be used as singly or as a mixture thereof.

When said solvent is used, the solvent is used such that the concentration of the phenol-compound-containing vegetable oil is preferably 0.5 to 70% by weight, more preferably 1 to 50% by weight. The reaction temperature for carrying out the present invention is in the temperature range where the aliphatic unsaturated double bonds in the side chains of the phenol-compound-containing vegetable oil are not modified by heating, and where the reaction medium remains fluid. When the solvent is not used, such temperatures should be in a temperature range of higher than the melting point of the phenol-compound-containing vegetable oil, or higher than the melting point of comonomers if the comonomers are coexistent. The temperature range is preferably 0° C. to 180° C., more preferably 0° C. to 150° C. Particularly, the process of the present invention is characterized in that the polymerization reaction can be carried out even under low-temperature conditions in the range of 0 to 40° C. Further, for example, when the polymerization reaction is carried out using substantially no solvent in the present invention, particularly by using hydrogen peroxide as the oxidizing agent and Fe (II)-salen contained in the aforementioned formula (II) as the transition metal complex, exothermal reaction may occur upon addition of hydrogen peroxide, and the temperature in the system rise (in the range from the temperature before addition of hydrogen peroxide to about 140° C.), which however is not problematic. Further, when the polymerization reaction is carried out using the aforementioned formula (I) or (IV), the reaction temperature is preferably 40 to 180° C., more preferably 60 to 180° C.

The curable resin composition of the present invention can be further cured by crosslinking in the presence of the oxidizing catalyst. This curing reaction is effective as curing reaction in case of using as coatings, etc., and the so-called metal drier is used as the oxidizing catalyst. The metal drier is not particularly limited insofar as it is a compound with an ability to oxidize unsaturated fatty acids to cause crosslinking reaction, and various metals or salts thereof can be used. Specifically, it can use naphthenate, octylate, or oleate of cobalt, manganese, lead, calcium, cerium, zirconium, zinc, iron, or copper, preferably can use cobalt naphthenate, lead naphthenate, or manganese naphthenate. Various metal complexes, used as the polymerization catalyst in the present invention, also have an ability as the metal drier, and may just be used without removing them from these reaction system. Further, the metal drier may be used as not only singly but also a mixture of two kinds or more. The amount of addition of the metal drier vary according to the type of the metal drier, etc., the metal drier is generally used preferably in the range of 0.001% by weight to 1% by weight in terms of metal content relative to the curable resin composition.

The molecular weight of the polymer obtained in the present invention is preferably in the range of 350 to 100,000 of number average molecular weight, particular preferably in the range of 500 to 30,000 of number average molecular weight.

In the present invention, the oxidative polymerization reaction of the phenol-compound-containing vegetable oil can be carried out in various modes. For example, a solution of the phenol-compound-containing vegetable oil and a solution of the transition metal complex may be prepared separately and then be introduced into the same vessel, or the metal complex or a solution thereof may be added into a solution of the phenol-compound-containing vegetable oil. In case of addition of hydrogen peroxide, a method of adding the peroxide gradually to a solution of the phenol-compound-containing vegetable oil and the transition metal complex is preferable. Further, besides the method of the aforementioned solution polymerization, there is no problem even if one uses the methods of suspension polymerization and dispersion polymerization, which carried out the reaction of the phenol-compound-containing vegetable oil and the transition metal complex by addition of a dispersion stabilizer to the reaction system, or the method of emulsion polymerization, which carried out the reaction of the phenol-compound-containing vegetable oil and the transition metal complex by addition of an emulsion stabilizer to the reaction system. Additionally, combinations of various methods are usable not as long as the transition metal complex is inactivated. In production of the resin composition of the present invention (including the curable resin composition), there is no problem even if the transition metal complex used in oxidative polymerization may remain as it is in the resin composition without removing from the composition after the reaction.

There is no problem even if vegetable oil monomers containing a remaining phenol compound which do not react yet, or the other monomer components given to copolymerization, additionally the polymer resin that contains the phenol-compound-containing vegetable oil in the transition metal complex, are contained in the resin composition and the curable resin composition of the present invention. Because these monomers are generally viscous at room temperature, they may be used as they are, without using a diluting solvent in the case where these monomers are used at room temperature. In this case, there is no problem insofar as the ratio of the vegetable oil monomers containing remaining phenol compounds in the curable resin composition, or of the other monomer components given to copolymerization, is a range without exerting an influence on the physical properties of the coating film, such as the curing time of the coating film, etc., hardness of the coating film, and the physical properties of the coating film, etc., such as leveling properties of the coating film, wetting properties of the coating film, etc.

Further, as can also be estimated from the fact that cardanol of a constituent component in the aforementioned resin has a similar structure to urushiol of a major component of urushi, the aforementioned resin have characterized that the resulting coating film is similar to a urushi coating film. In this case, polysaccharides and proteins as components other than urushiol in urushi may be added in order to let the resulting coating film resembles a natural urushi coating film more, for example, starch (derivatives), arabic gum, casein, pullulan, gelatin (hydrolysates), etc., can be mentioned.

The curable resin compositions of the present invention can be cured by using various methods. That is, because these resin compositions have an unsaturated double bond in the polymer side chain, or a phenolic hydroxyl group on the site of the aromatic ring, the curable product can be prepared by using a known method based on these reactivity sites to progress a crosslinking reaction. For example, these compositions can be cured by utilizing the aforementioned crosslinking reaction with oxygen or organic peroxides, crosslinking with phenol resin and amino resin, crosslinking with halogen compounds, crosslinking with isocyanates, crosslinking with epoxy compounds, crosslinking by heating, crosslinking by light, crosslinking by UV irradiation, crosslinking by electron beam and y-ray, or the like.

The pencil hardness of the curable resin composition of the present invention, as determined by 8.4.2 Hand Scratching Method in JIS-K5400, can satisfy the condition of 9H to 2B, preferably 9H to HB, within 2 weeks, preferably within 1 week, after the curable resin composition was coated on a base material and then change to a coating film.

In the curable resin composition of the present invention, an phenolic hydroxyl group, which do not react yet, may be contained in the site of the aromatic ring. Further, the side chain has an aliphatic unsaturated double bond. Accordingly, various derivatives can be produced by using these reactive sites. For example, epoxy etherification by reaction of the phenolic hydroxyl group with epichlorohydrin, allyl etherification by allyl chloride, and (meth)acryl derivatizations by esterifying with (meth)acrylic acid (derivatives), and the like, can be mentioned.

The curable resin composition of the present invention may be used after modification with natural rubber or synthetic rubber, with oils such as tung oil, linseed oil, or soybean oil, or with rosin, glycerin, ethylene glycol, pentaerythritol, etc.

Further, the curable resin composition of the present invention, if necessary, can be contained resin components such as phenol resin, rosin-modified phenol resin, alkyd resin, polyester resin, polyamide resin, etc., fat and oil components such as tung oil, linseed oil, dehydrated castor oil, aliphatic acids, etc., a pigment or dye such as yellow, red, deep blue and black pigment, etc., as color agent, filler such as natural rubber, synthetic rubber, wood flour, cellulose, asbestos, glass fiber, woven fablic, nonwoven fabric, etc., releasing agent, solvents of terpine-type, aliphatic-type, or aromatic-type, and auxiliary agent such as leveling improver, thickener, plasticizer, anti-ultraviolet agent, antioxidant, antistatic agent, etc., and can be used in a variety of utilities such as a raw material for a urushi-like coating, a material for forming a coating film, a compound for recording material, a raw material for ink, a raw material for coating, a raw material for adhesive, a raw material for epoxy resin, a raw material for photoresist, a raw material for antioxidant, a molding material, a raw material for laminated material, a raw material for adhesive, a raw material for binder, a raw material of a phenol resin for casting, a raw material of phenol resin for rubber blending, and a raw material of a phenol resin for fiber plate.

According to the present invention, a curable resin composition containing a resin formed in the presence of a transition metal complex by polymerizing the oxidative-polymerizable compound including the phenol-compound-containing vegetable oil component can be obtained under mild conditions. According to the method of the present invention by oxidative polymerization of a phenol-compound-containing vegetable oil by using a specific catalyst, there can be obtained a curable resin composition, that contains a polymer which phenylene bond unit and oxyphenylene bond unit bound at random, and whose an aliphatic unsaturated double bond in the side chain is allowed to remain.

According to the present invention, a curable resin composition preferable as a urushi-like coating, etc., can be obtained without using formalin.

Further, because the method of the present invention does not use formalin as a material, there is no problem of generation of formalin from a product of the resin during and after the stage of production of the resin, and this method is very excellent in the points that they can answer the requirements, of an increasing of consciousness toward environmental problems, a deodorization of living environment, a safety or health for the human body, etc.

The present invention is summarized as follows:

(1) A curable resin composition, comprising a resin formed, in the presence of a transition metal complex, by polymerizing an oxidative-polymerizable compound that contains a phenol-compound-containing vegetable oil.

(2) The curable resin composition according to item (1), which comprises the resin formed, in the presence of a transition metal complex, and oxygen or a peroxide, by polymerizing the oxidative-polymerizable compound that contains a phenol-compound-containing vegetable oil.

(3) The curable resin composition according to item (1) or (2), wherein the phenol-compound-containing vegetable oil is a cashew nut shell liquid.

(4) The curable resin composition according to any one of items (1) to (3), wherein the transition metal complex is a complex represented by the aforementioned formula (I), (II), (III), or (IV).

(5) The curable resin composition according to any one of items (1) to (4), wherein a transition metal in the transition metal complex is iron, cobalt, vanadium, chromium, manganese, nickel, copper, or vanadium oxide.

(6) The curable resin composition according to any one of items (1) to (5), wherein the curable resin composition further comprises a metal drier.

(7) A method for producing a curable resin composition comprising a resin formed, in the presence of a catalyst, by polymerizing an oxidative-polymerizable compound that contains a phenol-compound-containing vegetable oil, wherein the catalyst is a transition metal complex.

(8) The method for producing a curable resin composition according to item (7), which comprises polymerizing the oxidative-polymerizable compound that contains a phenol-compound-containing vegetable oil, in the presence of a transition metal complex, and oxygen or a peroxide.

(9) The method for producing a curable resin composition according to item (7) or (8), wherein the phenol-compound-containing vegetable oil is a cashew nut shell liquid.

(10) The method for producing a curable resin composition according to any one of items (7) to (9), wherein the transition metal complex is a complex represented by the aforementioned formula (I), (II), (III), or (IV).

(11) The method for producing a curable resin composition according to any one of items (7) to (10), the curable resin composition containing a resin formed, in the presence of a catalyst, by polymerizing an oxidative-polymerizable compound that contains a phenol-compound-containing vegetable oil, wherein the polymerization reaction is carried out using substantially no solvent.

(12) A coating resin composition, which contains a metal drier in the curable resin composition described in item (1).

EXAMPLES

Next, the present invention will be described in more detail with reference to the following examples, however the invention should not be constructed as being limited thereto.

The phenol-compound-containing vegetable oil used in the present examples was a cashew nut shell liquid that was obtained by heat treatment of a cashew oil extracted from a cashew nut. The oil is that iodine value was about 290, and the composition (as determined from each peak area analyzed by gas chromatography) was 83.8% of cardanol (number of olefins in the side chain is that 0=2.6%, 1=28.6%, 2=18.3%, 3=34.3%), 7.7% of cardol (as a mixture of various side chain isomers), and 1.6% of methyl cardol (as a mixture of various side chain isomers).

The number average molecular weight (referred to hereinafter as Mn) and the molecular weight distribution (weight average molecular weight (Mw)/Mn) of the polymer, and the degree of conversion (referred to hereinafter as Conv.), Mn, and the molecular weight distribution (referred to hereinafter Mw/Mn) of the cashew nut shell liquid, were determined by gel permeation chromatography (GPC), and calculated as reduced value of the standard polystyrene. Conv. expressed in % was determined, based on the result obtained from the aforementioned analysis, by calculating the formula: B/(A+B)×100, wherein A is a peak area of monomers, and B is a peak area of polymer, in the cashew nut shell liquid.

The remaining rate of the olefin site in the side chain of the polymer was determined with a proton NMR. That is, the total of the integrated peak areas in the vicinity of 5.8 ppm (—CH=CH$_2$), 5.4 ppm (—CH=CH—), 5.0 ppm (—CH=CH$_2$), 2.8 ppm (—CH=CH—CH$_2$—CH=CH—), and 2.0 ppm (—CH$_2$—CH=CH—) attributable to the olefin structure was divided by the integrated peak areas (internal standard) in the vicinity of 2.5 ppm (Ar—CH$_2$) attributable to methylene adjacent to the benzene which is not the olefin site, and then the residual degree was calculated by comparison with the value before polymerization as determined in the same manner.

As the transition metal complexes used in the present examples, Fe (salen), Co (salpta), and (Fe (salen))$_2$O were used.

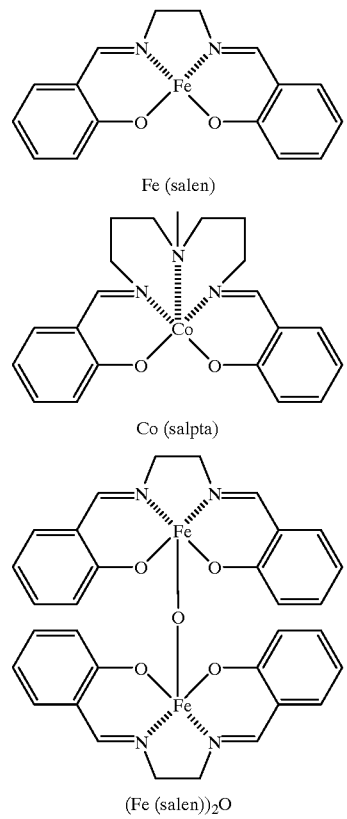

Fe (salen)

Co (salpta)

(Fe (salen))$_2$O

Example 1

A stirrer, 1.5 g of cashew nut shell liquid, 10 ml of 1,4-dioxane, and 8 mg of Fe (salen) were introduced into a 100 ml eggplant-type flask, and stirred by a magnetic stirrer. This flask was placed in an oil bath at 30° C. 57 µl of 30% aqueous hydrogen peroxide was added thereto 10 times at 6-minutes intervals with stirring. After addition, stirring was continued for 1 hour at 30° C., to allow the reaction to proceed. After the reaction was finished, an aliquot of the reaction solution was analyzed by GPC. The Conv. was 42%, the Mn was 3500, and the Mw/Mn was 1.70. Precipitates obtained by introducing a part of the reaction solution into a large amount of methanol were recovered by centrifugation, and were dried under reduced pressure. According to the proton NMR analysis of this product, it was confirmed that about 80% of olefin site in the side chain of the cashew nut shell liquid remain.

Example 2

A stirrer, 1.5 g of cashew nut shell liquid, 10 ml of toluene, and 16.1 mg of Fe (salen) were introduced into a 100 ml eggplant-type flask, and stirred by a magnetic stirrer. This flask was placed in an oil bath at 40° C. 107 µl of 30% aqueous hydrogen peroxide was added thereto 5 times at 15-minutes intervals with stirring. After addition, stirring was continued for 45 minutes at 40° C., to allow the reaction to proceed. After the reaction was finished, an aliquot of the reaction solution was analyzed by GPC. The Conv. was 87%, the Mn was 5600, and the Mw/Mn was 1.83. Precipitates obtained by introducing a part of the reaction solution into a large amount of methanol were recovered by centrifugation, and were dried under reduced pressure. According to the proton NMR analysis of this product, it was confirmed that 75% of olefin site in the side chain of the cashew nut shell liquid remain.

Example 3

The same procedure as in Example 1 was carried out except that 100 µl of pyridine was added. The Conv. was 55%, the Mn was 4100, and the Mw/Mn was 1.86.

Example 4

A stirrer, 600 mg of cashew nut shell liquid, 25 ml of toluene, and 10 mg of Co-Salpta were introduced into a 100 ml eggplant-type flask, and stirred by a magnetic stirrer. This flask was placed in an oil bath at 40° C. 145 µl of 6% aqueous hydrogen peroxide was added thereto 10 times at 12-minutes intervals with stirring. After addition, stirring was continued for 1 hour at 40° C., to allow the reaction to proceed. After the reaction was finished, an aliquot of the reaction solution was analyzed by GPC. The Conv. was 17%, the Mn was 2500, and the Mw/Mn was 1.73.

Example 5

The same procedure as in Example 4 was carried out except that (Fe (Salen))$_2$O was used in place of Co-Salpta. The Conv. was 80%, the Mn was 7600, and the Mw/Mn was 2.67.

Example 6

The same procedure as in Example 1 was carried out except that 61 mg of 2,4-dimethyl phenol was added to the cashew nut shell liquid. The Conv. was 42%, the Mn was 2800, and the Mw/Mn was 1.74. By HPLC analysis of the reaction solution, it was confirmed that 2,4-dimethyl phenol disappeared.

Example 7

The same procedure as in Example 1 was carried out except that 75 mg of p-t-butyl phenol was added to the cashew nut shell liquid. The Conv. was 44%, the Mn was 2800, and the Mw/Mn was 1.72. By HPLC analysis of the reaction solution, it was confirmed that p-t-butyl phenol disappeared.

Example 8

A stirrer, 15 g of cashew nut shell liquid, 100 ml of tetrahydrofuran, and 80 mg of Fe (Salen) were introduced into a 300 ml eggplant-type flask, and dissolved by stirring with a magnetic stirrer. This flask was placed in an oil bath at 30° C. 566 µl of 30% aqueous hydrogen peroxide was added thereto 10 times at 15-minutes intervals with stirring. After addition, the reaction was carried out by further stirring the mixture for 2 hours. After the reaction was finished, an aliquot of the reaction solution was analyzed by GPC. The Conv. was 44%, the Mn was 3700, and the Mw/Mn was 1.66. The reaction solution was concentrated under reduced pressure, and added little by little the reaction solution to 250 ml methanol. The formed brown oily matter thus was recovered by centrifugation, and was dried by reduced pressure. The resulting brown oily matter was 3.53 g. By GPC analysis, it was confirmed that the Mn was 5900, and the Mw/Mn was 1.54. Further, according to the proton NMR analysis of this product, it was confirmed that about 80% or more of olefin site in the side chain in the cashew nut shell liquid remain. 3 parts by weight of cobalt naphthenate (cobalt content, about 6%) was added to 100 parts by weight of the resulting brown oily matter, and mixed sufficiently. The mixture was applied with an applicator for a film thickness of 3 mil or 50 µm onto a glass plate, and immediately, it was placed in a thermostatic humidistat at 25° C. and 70% relative humidity. The finger touch drying time of the coating film formed by the 3 mil applicator, as determined by an RC type drying meter (Taiyu kizai Co., Ltd.), was 40 minutes. The pencil hardness was 6B or less. The coating film was taken out from the thermostatic humidistat after 24 hours, and stored in a cold and dark place. The pencil hardness, after 1 day, was 6B. The coating film hardness was increased with time, and the pencil hardness was 2B after 4 days, HB after 6 days, and 2H after 11 days. Further, the film thickness, after 6 days, was 46 µm. The curing reaction was monitored by FT-IR analysis, it was indicated that the absorption in the vicinity of 3010 cm$^{-1}$ attributable to the site of an unsaturated double bond in the side chain of the cashew nut shell liquid was significantly decreased with time. After one day, the coating film (formed by the 3 mil applicator) was measured for color difference (spectral calorimeter CM-3610d, Minolta), specular reflection gloss (gloss meter GM-268, Minolta), and reflection haze (Micro-haze Plus, Big Chemie Japan). The color difference was L*64.2, a*15.3, and b*52.3, the gloss was 20°=101.2 and 60°=106.2, and the reflection haze was 85.8. The resulting coating film was a lacquer-like coating film, which is yellowish-blown and transparent, and is excellent in touching feeling, gloss, etc. The coating film (pencil hardness 2H) formed by the 3 mil applicator was subjected after 21 days to thermogravimetric analysis (TGA). Measurement was conducted under argon. The temperature, which 5% reduction of the weight was given, was 173° C., and the temperature, which 10% reduction of the weight was given, was 266° C.

Further, the dynamic viscoelasticity of the coating film after 2 months, as determined by RHEOVIBRONDDV-II-EA (Toyo Baldwin) at an increasing temperature from room temperature to 200° C. by 1° C./min, at a frequency of 3.5 Hz, was observed at dynamic Tg=about 98° C. (tan δ=about 0.25).

Example 9

The cashew nut shell liquid resin obtained in Example 8 was applied, without adding cobalt naphthenate, by using an applicator for a film thickness for 3 mil or 50 μm onto a glass plate. After application, immediately it was placed for 30 minutes in a thermostatic apparatus at 150° C., then taken out and stored in a cold and dark place. The resulting coating film was a urushi-like coating film, which is yellowish blown and transparent, is excellent in touching feeling, gloss etc. After it was heat-treated and left to be cooled, its pencil hardness was 2B. The film hardness was increased with time, and the pencil hardness was HB after 5 days, and 2H after 15 days. The curing film was measured by FT-IR analysis, indicated that the absorption in the vicinity of 3010 $cm^{-1}$ attributable to the site of unsaturated double bonds in the side chain of the cashew nut shell liquid was significantly decreased. After 1 day, the coating film (formed by the 3 mil applicator) was measured for color difference, specular reflection gloss, and reflection haze in the same manner as in Example 8. The color difference was L*53.5, a*19.6, and b*41.6, the gloss was 20°=121.5 and 600=110.7, and the reflection haze was 11.4. The coating film (pencil hardness 2H), formed by the 3 mil applicator, was subjected after 21 days to thermogravimetric analysis (TGA). Measurement was performed under argon. The temperature, which 5% reduction of the weight was given, was 278° C., and the temperature, which 10% reduction of the weight was given, was 361° C.

By measurement of the dynamic viscoelasticity of the coating film after 4.5 months (under the same experimental conditions as in Example 8), the viscoelasticity was observed at dynamic Tg=about 135° C. (tan δ=about 0.14), but the tan δ curve was smoother, in the temperature range of about 100 to 150° C., than that of the aforementioned the room temperature cure.

Example 10

A stirrer, 1.5 g of cashew nut shell liquid, 20 ml of 1,4-dioxane, 16 mg of Fe (Salen), and 200 mg of diphenyl ether as the internal standard were introduced into a 100 ml eggplant-type flask, and stirred by a magnetic stirrer. This flask was placed in an oil bath at 30° C. 57 μl of 30% aqueous hydrogen peroxide was added thereto total 7 times at 15-minutes intervals under stirring. After addition, 12 mg of Fe (Salen) was added thereto, and 57 μl of 30% aqueous hydrogen peroxide was added twice at 15-minutes intervals (9 times in grand total). After the reaction was finished, an aliquot of the reaction solution was analyzed by GPC. The Conv. was 93%, the Mn was 4500, and the Mw/Mn was 3.34. As mentioned above, by adding the transition metal complex, which is divided a plurality time, and polymeriz ing in divided portions, the Conv. can be 90% or more. However, if 57 μl of 30% aqueous hydrogen peroxide was further added once, a gel was formed immediately after the addition.

Example 11

5 ml of methanol was added to a 100 ml eggplant-type flask, and stirred with a magnetic stirrer. A previously prepared solution of ethylene diamine and salicyl aldehyde in methanol, and a part of an aqueous solution of $FeSO_4.7H_2O$ were collected, and were introduced into the flask so that 1.8 mg of ethylene diamine, 6.6 mg of salicyl aldehyde, and 8.34 mg of $FeSO_4.7H_2O$ were added. The mixture was stirred at 60° C. for 30 minutes, and then concentrated under reduced pressure. 1.5 g of cashew nut shell liquid, 20 ml of 1,4-dioxane, and 57 μm of 30% aqueous hydrogen peroxide were added thereto total 10 times at 6-minutes intervals. After 2 hours from the initial addition of hydrogen peroxide, an aliquot of the reaction solution was analyzed by GPC. The Conv. was 44%, the Mn was 1800, and the Mw/Mn was 1.46. It was thus demonstrated that the transition metal complex may be synthesized in the reaction system.

Example 12

6 g of cashew nut shell liquid, and 96 mg of Fe (Salen) were introduced into a 50 ml three-necked flask, and sonicated for about 1 minute. Thereafter, the flask was provided with a stirring bar, and the mixture was mechanically stirred at room temperature at 250 rpm/min. 2.26 ml of 30% aqueous hydrogen peroxide was added thereto all at once. After 10 minutes, the temperature of the reaction solution increased to 116° C. After 30 minutes from the addition of hydrogen peroxide, an aliquot of the reaction solution was analyzed by GPC, indicated that the Conv. was 81%, the Mn was 3000, and the Mw/Mn was 4.6. The reaction solution was analyzed in the same manner after 2 hours, indicated that the Conv. was 80%, the Mn was 2900, and the Mw/Mn was 4.5. This product is a brown and viscous resin at room temperature, and it was confirmed by proton NMR analysis that about 74% olefin site in the side chain of the cashew nut shell liquid remain.

Examples 13 to 16

A stirrer, 1.5 g (5 mmol) of cashew nut shell liquid, 20 ml of 1,4-dioxane, and 0.5 or 0.6 mol % of a transition metal complex relative to the cashew nut shell liquid were introduced into a 50 ml three-necked flask, and sonicated for about 1 minute. Thereafter, the flask was equipped with a stirring rod, placed in an oil bath at 30° C., and mechanically stirred at 250 rpm/min. 107 μl of 30% aqueous hydrogen peroxide was added thereto total 10 times at 6-minutes intervals with stirring. The transition metal complexes, which are shown below, were used. The results are shown in Table 1.

TABLE 1

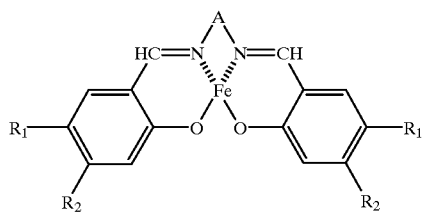

| Example | Transition metal complex A | R₁ | R₂ | mol % | Sampling time | conv. (%) | Mn | Mw/Mn |
|---|---|---|---|---|---|---|---|---|
| 13 | —(CH$_2$)$_3$— | H | H | 0.5 | 2 h | 27 | 1400 | 1.3 |
| 14 | —(CH$_2$)$_2$— | t-butyl | t-butyl | 0.6 | 2 h | 33 | 1500 | 1.4 |
| 15 | —CH$_2$CH(CH$_3$)— | H | H | 0.6 | 2 h | 45 | 1900 | 1.5 |
| 16 | —CH$_2$C(CH$_3$)$_2$— | H | H | 0.6 | 2 h | 37 | 1600 | 1.4 |

Examples 17 to 37

The same procedure as in Example 12 was performed except that the transition metal complex and the reaction temperature were varied. The amount of the used transition metal complex was 1 mol % relative to the cashew nut shell liquid (assuming that 6 g was 20 mmol). The results are shown in Table 2.

TABLE 2

| Example | Transition metal complex | Temperature of oil bath before addition of hydrogen peroxide (° C.) | Sampling time | conv. (%) | Mn | Mw/Mn |
|---|---|---|---|---|---|---|
| 17 | Cu-salen | 80 | 0.5 h | 22(24) | 1100 | 1.25 |
|    |          |    | 24 h  | 32(36) | 1400 | 1.58 |
| 18 | Zn-salen | 80 | 2 h   | 19(18) | 1000 | 1.22 |
|    |          |    | 24 h  | 43(41) | 1600 | 2.15 |
| 19 | Ni-salen | 80 | 0.5 h | 53(57) | 2200 | 3.63 |
|    |          |    | 1 h   | 59(62) | 2800 | 7.96 |
| 20 | Mn-salen | 80 | 0.5 h | 23(23) | 1100 | 1.23 |
|    |          |    | 24 h  | 38(37) | 1300 | 1.46 |
| 21 | Co-salen | 80 | 2 h   | 40(41) | 1800 | 1.76 |
|    |          |    | 24 h  | 46(48) | 2000 | 2.68 |
| 22 | VO-salen | 80 | 2 h   | 27(30) | 1300 | 1.31 |
|    |          |    | 24 h  | 33(40) | 1400 | 1.62 |
| 23 | [1)]Fe-salen, n = 3 | r.t | 0.5 h | 61(64) | 2300 | 2.34 |
|    |          |    | 2 h   | 64(64) | 2300 | 2.39 |
| 24 | [2)]Fe-salen, n = 4 | r.t | 24 h | 31(29) | 1200 | 1.29 |
| 25 | [3)]Fe-salen, n = 5 | r.t | 2 h  | 34(30) | 1200 | 1.33 |
|    |          |    | 24 h  | 35(33) | 1200 | 1.34 |
| 26 | [4)]Fe-salen, n = 6 | r.t | 24 h | 33(33) | 1200 | 1.28 |
| 27 | [5)]OMe—Fe-salen | r.t | 0.5 h | 39(41) | 1400 | 1.46 |
|    |          |    | 2 h   | 43(41) | 1500 | 1.59 |
| 28 | [6)](tBu)$_2$-Fe-salen | r.t | 0.5 h | 45(45) | 1500 | 1.48 |
|    |          |    | 2 h   | 48(47) | 1500 | 1.50 |
| 29 | [7)]Fe-acacen | 80 | 2 h | 41(40) | 1500 | 1.67 |
|    |          |    | 24 h | 44(44) | 1600 | 2.02 |
| 30 | [8)]Fe(III)-acac | 80 | 2 h | 26(27) | 1200 | 1.24 |
|    |          |    | 24 h | 33(36) | 1400 | 1.52 |
| 31 | Cu(II)-acac | 80 | 0.5 h | 35(25) | 1200 | 1.29 |
|    |          |    | 24 h  | 41(41) | 1400 | 1.59 |
| 32 | Co(II)-acac | 80 | 0.5 h | 50(51) | 1900 | 1.53 |
|    |          |    | 24 h  | 60(60) | 2500 | 2.91 |
| 33 | Mn(II)-acac | 80 | 2 h | 20(20) | 1200 | 1.25 |
|    |          |    | 24 h | 39(35) | 1400 | 1.65 |
| 34 | Vo(II)-acac | 80 | 2 h | 22(26) | 1200 | 1.25 |
|    |          |    | 24 h | 34(39) | 1400 | 1.61 |
| 35 | [9)]Cu phthalocyanine derivative | 80 | 2 h | 35(38) | 1400 | 1.34 |
|    |          |    | 24 h | 50(50) | 1900 | 2.45 |
| 36 | Fe phthalocyanine | 80 | 2 h | 43(45) | 1600 | 1.46 |
|    |          |    | 24 h | 48(50) | 1600 | 1.72 |
| 37 | Mn phthalocyanine | 80 | 0.5 h | 20(21) | 1300 | 1.32 |
|    |          |    | 2 h   | 24(27) | 1500 | 1.37 |

(Note)1) The same as the transition metal complex in Example 13.

2) The same as the transition metal complex in Example 13 except that A was replaced by —(CH$_2$)$_4$—.

3) The same as the transition metal complex in Example 13 except that A was replaced by —(CH$_2$)$_5$—.

4) The same as the transition metal complex in Example 13 except that A was replaced by —(CH$_2$)$_6$—.

5) The same as the transition metal complex in Example 14 except that R$_1$ was replaced by OCH$_3$, and R$_2$ by H.

6) The same as the transition metal complex in Example 14.

7) N,N'-bis(1-methyl-3-oxobutylidene)-ethylene diamine.

8) Acetyl acetonato iron (III) (hereafter, acac in the table refers to acetyl acetonato).

9) Copper (II)-2,3,9,10,16,17,23,24-octakis (octyloxy)-29H,31H-phthalocyanine

With respect to the aforementioned Examples 17, 21, 27, 31, 33, 35 and 37, a curing test was performed. That is, each of the aforementioned reaction solutions, obtained in each of Examples, was introduced into a large amount of water-contained methanol (90% aqueous methanol solution in Examples 17, 21, 33, 35 and 37, or 95% aqueous methanol solution in Examples 27 and 31), and the resulting precipitates (resin) were recovered by decantation. A part of the resin was placed on a glass plate, and after the solvent was removed by cool air, it was examined by GPC analysis and proton NMR analysis. Then, cobalt naphthenate (metal content: 6%) was added thereto at an amount of 3% by weight relative to the dry weight of the resin, and mixed-well therewith, and the mixture was applied onto another glass plate by a 50 μm applicator, and immediately placed in a thermostatic high humidistat at 20° C. and 70% relative humidity. After a predetermined time, the pencil hardness was measured. The results are shown collectively in Table 3. Further, monomers have been contained in the range of 6 to 32% in the tested resins, but the Mn and the Mw/Mn were calculated without including these monomers.

TABLE 3

| Example | Mn | Mw/Mn | Remaining monomer (%) | Passed day | Value of pencil hardness | Remaining rate of olefin (%) |
|---|---|---|---|---|---|---|
| 17 | 2600 | 1.56 | 26 | 3 | HB | 100 |
| 21 | 3600 | 2.07 | 15 | 3 | HB | 97 |
| 27 | 3000 | 1.80 | 10 | 5 | 2B | 100 |
| 31 | 5100 | 2.88 | 6 | 3 | HB | 74 |
| 33 | 2800 | 1.77 | 23 | 3 | HB | 72 |
| 35 | 3500 | 2.73 | 14 | 3 | HB | 75 |
| 37 | 2800 | 1.56 | 32 | 3 | HB | 93 |

In all Examples, the resulting resins were not cashew dusts but curable resin compositions.

Comparative Example 1

2 g of cashew nut shell liquid was introduced into a 100 ml eggplant-type flask equipped with an air-cooling tube, and 4 ml of conc. sulfuric acid and 4 ml of ethanol were added thereto. This solution was heated for 15 minutes so that its temperature was increased to 200° C. (temperature of the oil bath), and at this temperature, the solution was allowed to react for 5 minutes. Then, the reaction solution was left and cooled. The formed polymer was a black powdery material (cashew dust), and was insoluble in various organic solvents (e.g. N,N'-dimethyl formamide, 1,4-dioxane etc.). From this product, a cured coating film could not be formed by adding a metal drier etc.

Comparative Example 2

2 g of cashew nut shell liquid was introduced into a 100 ml eggplant-type flask equipped with an air-cooling tube, and 2 ml of conc. sulfuric acid and 4 ml of ethanol were added thereto. This solution was heated for 10 minutes so that its temperature was increased to 100° C. (temperature of the oil bath), and at this temperature, the solution was stirred for 1 hour. Thereafter, the reaction solution was left and cooled to room temperature or thereabout, and the formed viscous material was dissolved in a small amount of chloroform, and dropped to a large amount of methanol. The methanol-chloroform solution was removed by decantation, and the viscous material was recovered by using a small amount of chloroform, and after the chloroform was distilled and removed away under reduced pressure, it was dried under reduced pressure. The resulting resin was a brown viscous material. According to the proton NMR analysis thereof, it was confirmed that the remaining rate of olefin in the side chain was 23%. Further, it was confirmed by FT-IR analysis that the aliphatic unsaturated double bond in the side chain of the cashew nut shell liquid was significantly reduced. Formation of a curing film was attempted by adding cobalt naphthenate to this resin (in the same manner as in Example 8 except that the curing reaction and storage were conducted in a thermostatic humidistat at 20° C. and 70% relative humidity), and were evaluated (in the same manner as in Example 8). Further, formation of a cured film was attempted by heating said resin at 180° C. for 30 minutes (evaluation was carried out in the same manner as in Example 8). In the room temperature curing, the pencil hardness of the coated film was 6B or less even after 3 months. The pencil hardness of the coated film cured by heating was 6B after 1 day or even after 3 months. Thus, the resin, obtained by polymerizing the cashew nut shell liquid with the acid catalyst, did not form a coating film having practical hardness by the metal drier or heat treatment.

Comparative Example 3

The curing reaction of a commercial cashew resin coating (No. 53 transparent, Cashew Co., Ltd.) was performed in the same manner as in Comparative Example 2. By its GPC analysis, the Mn was 2800, and the Mw/Mn was 1.77. In the room temperature curing, the dust free time was 4 hours, and the pencil hardness was HB after 4 hours or 4 days, H after 6 days, and 2H after 14 days. Further, a value of the specular reflection gloss at 600 after 7 days was 114. Further, by a measurement of the dynamic viscoelasticity of the coating film after 2 months (under the same experimental conditions as in Example 8), the viscoelasticity was observed at dynamic Tg=about 97° C. (tan δ=about 0.35).

In the curing by heating, the pencil hardness was H after 1 day, 2H after 4 days, and 4H after 14 days. Further, a value of the specular reflection gloss at 60° after 7 days was 107. Further, by a measurement of the dynamic viscoelasticity of the coating film after 2 months (under the same experimental conditions as in Example 8), the viscoelasticity was observed at dynamic Tg=about 120° C. (tan δ=about 0.11), but the tan δ curve was smooth in the temperature range of about 80 to 200° C., as compared with that of the aforementioned room temperature curing.

Comparative Example 4

The curing reaction of a commercial natural urushi (Sugurome Urushi made in China) was conducted in the same manner as in Comparative Example 3. In the room temperature curing, the dust free time was 30 minutes, and the pencil hardness was 6B after 4 days, HB after 6 days, and 2H after 14 days. A value of the specular reflection gloss at 60° after 7 days was 105. Further, by measurement of the dynamic viscoelasticity of the coating film after 2 months (under the same experimental conditions as in Example 8), the viscoelasticity was observed at dynamic Tg=about 140° C. (tan δ=about 0.14), but the tan δ curve was smooth at the temperature range of about 120 to 160° C.

In the curing by heating, the pencil hardness after heating was HB after 1 day, HB after 4 days, and 2H after 14 days. Further, the specular reflection gloss at 60° after 7 days was 114. It was 104. Further, by measurement of the dynamic viscoelasticity of the coating film after 2 months (under the same experimental conditions as in Example 8), the viscoelasticity was observed at dynamic Tg=about 135° C. (tan δ=about 0.085), but the tan δ curve was smooth at the temperature range of about 120 to 190° C.

As described above, a curable resin composition was obtained in the present invention by polymerizing the phenol-compound-containing vegetable oil with a transition metal complex. This resin forms a cured film at room temperature or under heating (e.g. 150° C.), and the appearance and physical properties of the cured coating film were not only equivalent to a commercial cashew resin coating prepared by modifying a cashew nut shell liquid with formalin, but also comparable to natural urushi.

INDUSTRIAL APPLICABILITY

The curable resin composition of the present invention is preferable as a curable resin composition useful as a raw material for urushi-like coating, a friction material, a brake lining material, a brake pad material, a material for forming a coating film, a compound for recording material, a raw material for ink, a raw material for coating, a raw material for adhesive, a raw material for epoxy resin, a raw material for photoresist or antioxidant, and a starting material for functional polymer.

The method for producing a curable resin composition of the present invention is preferable as a process wherein a curable resin composition comprising a resin formed in the presence of a transition metal complex by polymerizing an oxidative-polymerizable compound that contains a phenol-compound-containing vegetable oil can be obtained under mild conditions. The method for producing a curable resin composition by oxidative polymerization of a phenol-compound-containing vegetable oil by using a specific catalyst of the present invention is preferable as a process capable of preparing a curable resin composition, comprising a polymer, which phenylene bonding units and oxyphenylene bonding units bound at random, wherein aliphatic unsaturated double bonds in the side chains are allowed to remain.

Further, the method of the present invention does not use formalin as a material so that there is no problem of generation of formalin from a product of the resin during and after the stage of production of the resin, and this process is extremely excellent as a method for producing a curable resin composition for use as a raw material for urushi-like coatings in the points that the consciousness toward environmental problems has increased, the process can cope with requirements such as deodorization of the living environment, safety, health, etc., for the human body.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A curable resin composition, comprising a resin formed, in the presence of a transition metal complex, by polymerizing an oxidative-polymerizable compound that contains a phenol-compound-containing vegetable oil.

2. The curable resin composition as claimed in claim 1, which comprises the resin formed, in the presence of a transition metal complex, and oxygen or a peroxide, by polymerizing the oxidative-polymerizable compound that contains a phenol-compound-containing vegetable oil.

3. The curable resin composition as claimed in claim 1 or 2, wherein the phenol-compound-containing vegetable oil is a cashew nut shell liquid.

4. The curable resin composition as claimed in claim 1 or 2, wherein the transition metal complex is a complex represented by the following formula (I), (II), (III), or (IV):

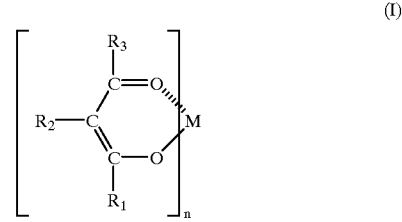

(I)

wherein M represents a residue containing a transition metal atom; $R_1$ and $R_3$ each independently represent a hydrogen atom, a hydrocarbon group, a substituted hydrocarbon group, $O^-$, a hydrocarbon oxy group, a substituted hydrocarbon oxy group, an amino group, or a substituted amino group; $R_2$ represents a hydrogen atom, a hydrocarbon group, a substituted hydrocarbon group, a hydrocarbon oxy group, a substituted hydrocarbon oxy group, a hydrocarbon oxycarbonyl group, a substituted hydrocarbon oxycarbonyl group, a cyano group, a nitro group, or a halogen atom; $R_1$ and $R_2$, and/or $R_2$ and $R_3$ may form a ring; and n is an integer of 1 to 3;

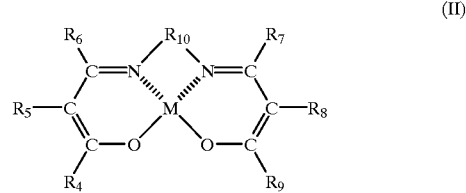

(II)

wherein M represents a residue containing a transition metal atom; $R_4$ and $R_9$ each independently represent a hydrogen atom, a hydrocarbon group, a substituted hydrocarbon group, $O^-$, a hydrocarbon oxy group, a substituted hydrocarbon oxy group, an amino group, or a substituted amino group; $R_5$ and $R_8$ each independently represent a hydrogen atom, a hydrocarbon group, a substituted hydrocarbon group, a hydrocarbon oxy group, a substituted hydrocarbon oxy group, a hydrocarbon oxycarbonyl group, a substituted hydrocarbon oxycarbonyl group, a cyano group, a nitro group, or a halogen atom; $R_6$ and $R_7$ each independently represent a hydrogen atom, a hydrocarbon group, a substituted hydrocarbon group, or $O^-$; $R_{10}$ represents a divalent hydrocarbon group or substituted hydrocarbon group; and $R_4$ and $R_5$, and/or $R_8$ and $R_9$ may form a ring;

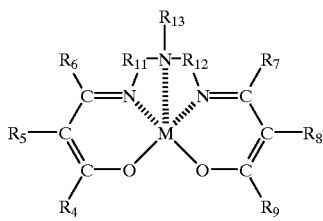

(III)

wherein M represents a residue containing a transition metal atom; $R_4$ and $R_9$ each independently represent a hydrogen atom, a hydrocarbon group, a substituted hydrocarbon group, $O^-$, a hydrocarbon oxy group, a substituted hydrocarbon oxy group, an amino group, or a substituted amino group; $R_5$ and $R_8$ each independently represent a hydrogen atom, a hydrocarbon group, a substituted hydrocarbon group, a hydrocarbon oxy group, a substituted hydrocarbon oxy group, a hydrocarbon oxycarbonyl group, a substituted hydrocarbon oxycarbonyl group, a cyano group, a nitro group, or a halogen atom; $R_6$ and $R_7$ each independently represent a hydrogen atom, a hydrocarbon group, a substituted hydrocarbon group, or $O^-$; $R_{11}$ and $R_{12}$ each represent a divalent hydrocarbon group, or substituted hydrocarbon group; $R_{13}$ represents a hydrogen atom, a hydrocarbon group or a substituted hydrocarbon group; and $R_4$ and $R_5$, and/or $R_8$ and $R_9$ may form a ring;

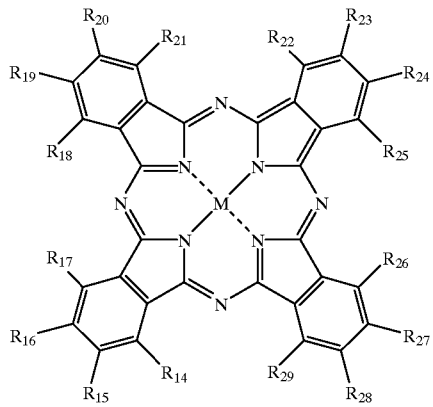

(IV)

wherein M represents a residue containing a transition metal atom; $R_{14}$ to $R_{29}$ each independently represent a hydrogen atom, a hydrocarbon group, a substituted hydrocarbon group, $O^-$, a hydrocarbon oxy group, a substituted hydrocarbon oxy group, an amino group, or a substituted amino group, a hydrocarbon oxycarbonyl group, a substituted hydrocarbon oxycarbonyl group, a cyano group, a nitro group, or a halogen atom, or $O^-$; $R_{14}$ and $R_{15}$, and/or $R_{15}$ and $R_{16}$, and/or $R_{16}$ and $R_{17}$, and/or $R_{18}$ and $R_{19}$, and/or $R_{19}$ and $R_{20}$, and/or $R_{20}$ and $R_{21}$, and/or $R_{22}$ and $R_{23}$, and/or $R_{24}$ and $R_{25}$, and/or $R_{26}$ and $R_{27}$, and/or $R_{27}$ and $R_{28}$, and/or $R_{28}$ and $R_{29}$ may form a ring.

5. The curable resin composition as claimed in claim 1 or 2, wherein a transition metal in the transition metal complex is iron, cobalt, vanadium, chromium, manganese, nickel, copper, or vanadium oxide.

6. The curable resin composition as claimed in claim 1 or 2, wherein the curable resin composition further comprises a metal drier.

7. A method for producing a curable resin composition comprising a resin formed, in the presence of a catalyst, by polymerizing an oxidative-polymerizable compound that contains a phenol-compound-containing vegetable oil, wherein the catalyst is a transition metal complex.

8. The method for producing a curable resin composition as claimed in claim 7, which comprises polymerizing the oxidative-polymerizable compound that contains a phenol-compound-containing vegetable oil, in the presence of a transition metal complex, and oxygen or a peroxide.

9. The method for producing a curable resin composition as claimed in claim 7 or 8, wherein the phenol-compound-containing vegetable oil is a cashew nut shell liquid.

10. The method for producing a curable resin composition as claimed in claim 7 or 8, wherein the transition metal complex is a complex represented by the following formula (I), (II), (III), or (IV):

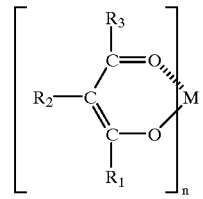

(I)

wherein M represents a residue containing a transition metal atom; $R_1$ and $R_3$ each independently represent a hydrogen atom, a hydrocarbon group, a substituted hydrocarbon group, $O^-$, a hydrocarbon oxy group, a substituted hydrocarbon oxy group, an amino group, or a substituted amino group; $R_2$ represents a hydrogen atom, a hydrocarbon group, a substituted hydrocarbon group, a hydrocarbon oxy group, a substituted hydrocarbon oxy group, a hydrocarbon oxycarbonyl group, a substituted hydrocarbon oxycarbonyl group, a cyano group, a nitro group, or a halogen atom; $R_1$ and $R_2$, and/or $R_2$ and $R_3$ may form a ring; and n is an integer of 1 to 3;

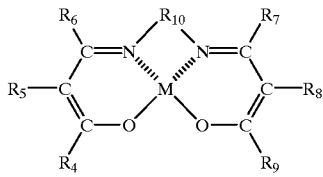

(II)

wherein M represents a residue containing a transition metal atom; $R_4$ and $R_9$ each independently represent a hydrogen atom, a hydrocarbon group, a substituted hydrocarbon group, $O^-$, a hydrocarbon oxy group, a substituted hydrocarbon oxy group, an amino group, or a substituted amino group; $R_5$ and $R_8$ each independently represent a hydrogen atom, a hydrocarbon group, a substituted hydrocarbon group, a hydrocarbon oxy group, a substituted hydrocarbon oxy group, a hydrocarbon oxycarbonyl group, a substituted hydrocarbon oxycarbonyl group, a cyano group, a nitro group, or a halogen atom; $R_6$ and $R_7$ each independently represent a hydrogen atom, a hydrocarbon group, a substituted hydrocarbon group, or $O^-$; $R_{10}$ represents a divalent hydrocarbon group, or substituted hydrocarbon group; and $R_4$ and $R_5$, and/or $R_8$ and $R_9$ may form a ring;

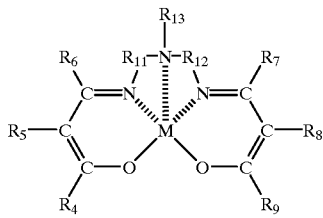

(III)

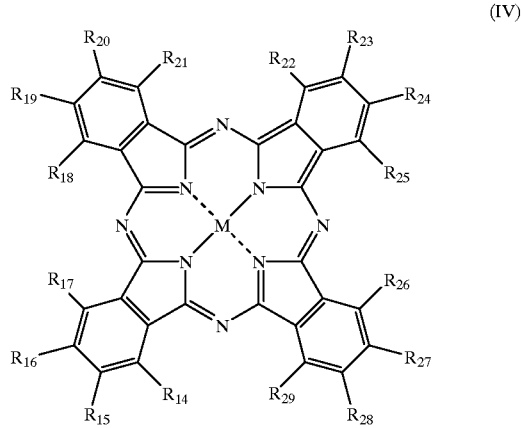

(IV)

wherein M represents a residue containing a transition metal atom; $R_4$ and $R_9$ each independently represent a hydrogen atom, a hydrocarbon group, a substituted hydrocarbon group, $O^-$, a hydrocarbon oxy group, a substituted hydrocarbon oxy group, an amino group, or a substituted amino group; $R_5$ and $R_8$ each independently represent a hydrogen atom, a hydrocarbon group, a substituted hydrocarbon group, a hydrocarbon oxy group, a substituted hydrocarbon oxy group, a hydrocarbon oxycarbonyl group, a substituted hydrocarbon oxycarbonyl group, a cyano group, a nitro group, or a halogen atom; $R_6$ and $R_7$ each independently represent a hydrogen atom, a hydrocarbon group, a substituted hydrocarbon group, or $O^-$; $R_{11}$ and $R_{12}$ each represent a divalent hydrocarbon group or substituted hydrocarbon group; $R_{13}$ represents a hydrogen atom, a hydrocarbon group or a substituted hydrocarbon group; and $R_4$ and $R_5$, and/or $R_8$ and $R_9$ may form a ring;

wherein M represents a residue containing a transition metal atom; $R_{14}$ to $R_{29}$ each independently represent a hydrogen atom, a hydrocarbon group, a substituted hydrocarbon group, a hydrocarbon oxy group, a substituted hydrocarbon oxy group, an amino group, a substituted amino group, a hydrocarbon oxycarbonyl group, a substituted hydrocarbon oxycarbonyl group, a cyano group, a nitro group, or a halogen atom, or $O^-$; $R_{14}$ and $R_{15}$, and/or $R_{15}$ and $R_{16}$, and/or $R_{16}$ and $R_{17}$, and/or $R_{18}$ and $R_{19}$, and/or $R_{19}$ and $R_{20}$, and/or $R_{20}$ and $R_{21}$, and/or $R_{22}$ and $R_{23}$, and/or $R_{24}$ and $R_{25}$, and/or $R_{26}$ and $R_{27}$, and/or $R_{27}$ and $R_{28}$, and/or $R_{28}$ and $R_{29}$ may form a ring.

11. The method for producing a curable resin composition as claimed in claim 7 or 8, the curable resin composition containing a resin formed, in the presence of a catalyst, by polymerizing an oxidative-polymerizable compound that contains a phenol-compound-containing vegetable oil, wherein the polymerization reaction is carried out using substantially no solvent.

12. A coating resin composition, which contains a metal drier in the curable resin composition as claimed in claim 1.

* * * * *